United States Patent [19]

Myers

[11] Patent Number: 4,533,726

[45] Date of Patent: Aug. 6, 1985

[54] POLYMERIC HYDROPHILE FROM CARBOXY TERMINATED LIQUID POLYMER, DIAMINE AND PHOSPHAZENE

[75] Inventor: Ronald E. Myers, Strongsville, Ohio

[73] Assignee: The B. F. Goodrich Company, New York, N.Y.

[21] Appl. No.: 629,376

[22] Filed: Jul. 10, 1984

[51] Int. Cl.³ ............................................. C08G 69/26
[52] U.S. Cl. .................................... 528/336; 528/332; 528/337; 528/345; 528/362; 528/392
[58] Field of Search ............... 528/337, 332, 345, 362, 528/392, 336

[56] References Cited

PUBLICATIONS

Product Literature, Hycar Elastomers, B. F. Goodrich Co., Cleveland, Ohio.

*Primary Examiner*—Harold D. Anderson
*Attorney, Agent, or Firm*—Woodrow W. Ban

[57] ABSTRACT

A polymeric reaction product between a carboxyl terminated reactive liquid polymer, a phosphazene, and a diamine in the presence of a scavenger for bi-products of the reaction, the scavenger preferably being a tertiary amine. The reaction product exhibits hyodrophilic properties.

10 Claims, No Drawings

POLYMERIC HYDROPHILE FROM CARBOXY TERMINATED LIQUID POLYMER, DIAMINE AND PHOSPHAZENE

FIELD OF THE INVENTION

This invention relates to polymeric substances having hydrophilic properties, and more particularly to reaction products of a phosphazene and a dicarboxyl reactive liquid polymer the reaction product having such hydrophilic properties. More specifically, this invention relates to a reaction product between a dicarboxyl reactive liquid polymer, a phosphazene and a diamine and to methods for making such a reaction product.

BACKGROUND OF THE INVENTION

Reactive liquid polymers are polymers having a hydrocarbon backbone and including reactive groups generally on both terminal positions. Among reactive or functional groups available in the terminal positions of such reactive liquid polymers are carboxyl groups. In certain reactive liquid polymers, reactive or functional groups such as carboxyl groups may be pendant from the backbone in addition to being present as terminal reactive groups. Such pendant groups are not necessarily identical to the terminal groups in functionality.

Reactive liquid polymers typically are 100% solids and yet, while containing no solvents, demonstrate generally liquid behavior and are possessed of a specific gravity generally less than 1.00. Reactive liquid polymers find uses relating to the reactive or functional groups in the terminal positions of the reactive liquid polymer which provide reaction sites enabling the reactive liquid polymers to react with other materials such as in a curing process. Such reactions can involve chain extension and cross linking, thereby forming solid elastomeric products.

From time to time it is desirable that elastomeric products produced employing reactive liquid polymers be possessed of hydrophilic properties. Where, for example, a reactive liquid polymer is polymerized and employed in conjunction with other elastomeric materials in forming an elastomeric object, inclusion of hydrophilic properties in the resulting elastomeric object may be desirable.

Owing to a terminal group that may provide reactive or functional capabilities, these reactive liquid polymers tend to provide a mechanism for introducing rubbery characteristics into compounds not otherwise demonstrating elastomeric properties. So, for example, carboxyl terminated reactive liquid polymers find utility in blends with unsaturated polyester resins that would otherwise be inherently brittle. Incorporation of carboxyl terminated reactive liquid polymers into elastomeric systems employed for the forming of elastomeric objects and coatings can enhance the elongation properties of the resulting objects and coatings in addition to providing improved impact resistance.

Reactive liquid polymers containing terminal carboxyl groups typically can be cured employing agents tending to react with the carboxyl groups of two or more molecules of the reactive liquid polymer. Such agents might include: (1) epoxy resins; (2) aziridinyl-type compounds; (3) carbodiimides; and (4) condensation resin intercures. It is also possible to obtain a cure employing polyamines such as triethylene tetraamine and with polyvalent metallic compounds such as zinc oxide. Such cures often tend to be thermoplastic and therefore weak. Where the backbone of a carboxyl terminated reactive liquid polymer is unsaturated, curing may be accomplished employing sulfur, but the resulting products tend to be relatively weak and somewhat brittle. It has been found that epoxy curing generally provides a cured reactive liquid polymer product having broadly satisfactory properties. For example, in one application, carboxyl terminated reactive liquid polymers are applied and cured employing an epoxy in place to provide a so-called moisture barrier in electrical systems whereby the cured reactive liquid polymer blocks access of moisture to electrical connections.

Phosphazene is a well known compound comprising phosphorous and nitrogen. Phosphazene is generally regarded as being a ring or chain polymer typically including two substituents on each phosphorus atom. Most typically, the phosphazene is characterized by cyclic trimer, cyclic tetramer, and high polymeric structures. It has been suggested that phosphazene be employed for crosslinking hydroxyl terminated liquid polybutadiene compounds and that phosphazene be employed to provide substitution products in reactions with amines, alcohols and phenols, and to activate carboxylic acid.

Reaction product derivatives of carboxyl terminated reactive liquid polymers having hydrophilic properties upon curing could find application scavenging water within sealed cavities while providing desirable rubbery or elastomeric properties. Such a hydrophilic polymer could find application in polymeric systems where the inclusion of a water scavenger may be desirable.

DISCLOSURE OF THE INVENTION

The present invention provides a composition of matter comprising the reaction product of a carboxyl terminated reactive liquid polymer, a phosphazene, and a diamine, in the presence of a scavenger, typically a tertiary amine. The reactive liquid polymer generally takes the form HOOCBCOOH, where B is a backbone including at least one polymerized vinylidene monomer selected from a group consisting of (a) monoolefins having between 2 and 14 carbon atoms; (b) dienes having between 4 and 10 carbon atoms; (c) vinyl and allyl esters; (d) vinyl and allylethers; and (e) acrylates of the form $CH_2=CH-COOR'$, R' being hydrogen, alkyl radical of not more than 18 carbon atoms, an alkoxyalkyl, alkylthioalkyl, or cyanoalkyl radical having not more than 12 carbon atoms.

The phosphazene includes between 3 and about 20 phosphorous atoms and includes at least one carboxyl activiating reactive substitutent much preferably chlorine. The diamine is selected from among saturated or unsaturated straight chained, branch chained, cyclic or acylic primary or secondary amines having between about 3 and about 12 carbon atoms. The scavenger should be capable of reacting with elimination products existing in the reaction of the liquid polymer, phosphazene and the diamine. Typically the scavenger is a tertiary or so called tert-amine including attached groups or radicals selected from among saturated or unsaturated straight chained, branched, cyclic or acylic radicals having not more than about 6 carbon atoms.

Preferably, B includes at least one of the monomers previously set forth polymerized with from 0 to about 50% by weight of at least one co-monomer selected from a group consisting of (a) vinyl aromatics having the formula $CH_2=CH-C_6R_5$, wherein R is one of hydrogen, halogen, an alkyl radical containing from 1 to 4 carbon atoms; (b) vinyl nitriles having the formula CH₂CR"CN wherein R" is one of hydrogen and an acyl radical; (c) divinyls and diacrylates; (d) amides of α,β-olefinically unsaturated carboxylic acids containing 2 to 8 carbon atoms; and (e) an allyl alcohol.

The monomers comprising the backbone, when being polymerized need not be pure. Mixtures of the monomers set forth above may provide desirable properties in a finished polymeric hydrophile. Most preferably, the backbone B is formed from 1,4 polybutadiene and 0 to about 50% by weight acrylonitrile. Typically the carboxyl content of reactive liquid polymers employed in making the hydrophilic polymer of the instant invention ranges between about 0.5 and 10.00 weight percent.

Typically the phosphazene is possessed of a tri or tetramer configuration and includes at least one chlorine constitutent. Typically the diamine is an alkyldiamine of between 3 and 12 carbon atoms. Any tert-amine employed for scavenging generally possesses not less than 3 and not more than about 18 carbon atoms.

In making the hydrophilic polymer of the instant invention, the reactive liquid polymer, the phosphazene, and the scavenger are combined, to which combination the diamine is added under vigorous agitation. The diamine addition is accomplished at a temperature sufficiently elevated to initiate an exothermic reaction between the reactants.

The above and other features and advantages of the invention will become more apparent when considered in conjunction with a description of a preferred embodiment which follows and forms a part of the specification.

BEST EMBODIMENT OF THE INVENTION

The present invention provides a hydrophilic polymer which results from a reaction occurring in a mixture of a carboxyl terminated reactive liquid polymer, a phosphazene, and a diamine, in the presence of a scavenger, most preferably a tert-amine.

The reactive liquid polymer employed is a carboxyl-terminated liquid polymer having a polymeric backbone consisting of carbon-carbon or from time to time carbon-oxygen linkages. The polymer has an average of from about 1.6 to about 2.4 carboxyl (COOH) groups per molecule. Preferably each reactive liquid polymer molecule includes two carboxyl groups, one located at each of the terminal ends of the polymer molecule. The reactive liquid polymer can additionally have carboxyl groups located pendent to the polymer backbone.

The carboxyl content of these polymers ranges from about 0.5% to about 10% by weight, based upon the weight of the polymer, and more preferably from about 1% to about 6% by weight. Carboxyl content can be determined by titration of a solution of the reactive liquid polymer to a phenolphthalein end point employing standarized alcoholic KOH.

These carboxyl terminated reactive liquid polymers have a molecular weight of from about 600 to about 10,000, as measured using a Mercolab Vapor Pressure Osmometer. These polymers are more conveniently described by their bulk viscosity, having a bulk viscosity of from about 500 centipoises to about 2,000,000 centipoises, measured at 27° C. using a Brookfield Model LVT viscometer having a No. 7 spindle at 0.5 to 100 rpm. More preferably, these polymers have a bulk viscosity from about 5000 centipoises to about 1,000,000 centipoises. Polymers having a bulk viscosity from about 10,000 centipoises to about 700,000 centipoises find particular utility in the practice of this invention.

The carboxyl terminated reactive liquid polymers employed in the practice of this invention have polymeric backbones comprising carbon-carbon linkages or carbon-oxygen linkages. Such polymers having carbon-carbon linkages are preferred. These reactive liquid carboxyl terminated polymers can contain interpolymerized units of one or more vinylidene monomers selected from (a) monoolefins containing 2 to about 14 carbon atoms such as ethylene, propylene, isobutylene, 1-butene, 1-pentene, 1-hexene, 1-dodecane, and the like; (b) dienes containing 4 to about 10 carbon atoms such as butadiene, isoprene, 2-isopropyl-1,3-butadiene, chloroprene and the like; (c) vinyl and allyl esters such as vinyl acetate, vinyl propionate, allyl acetate, and the like; (d) vinyl and allyl ethers such as vinyl methyl ether, allyl methyl ether, and the like; and (e) acrylates of the formula

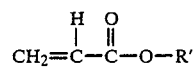

wherein R' is hydrogen, an alkyl radical containing 1 to about 18 carbon atoms or an alkoxyalkyl, and alkylthioalkyl, or cyanoalkyl radical, each containing 2 to about 12 carbon atoms. Examples of such acrylates are ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, β-cyanoethyl acrylate, cyanooctyl acrylate, and the like. From time to time more than one of these polymerized monomeric units are contained in the polymeric backbone.

The vinylidene monomers listed herein can be readily polymerized in major amounts with up to 50% by weight (of the total weight of the polymer) of (f) vinyl aromatics such as styrene, α-methyl styrene, vinyl toluene, and the like; (g) vinyl nitriles such as acrylonitriles, methacrylonitrile, and the like; (h) methacrylates and ethacrylates such as methyl methacrylate, ethyl methacrylate, octyl methacrylate, ethyl ethacrylate, and the like; and (i) divinyls and diacrylates such as divinyl benzene, divinyl ether, diethylene glycol diacrylate and the like. Reactive liquid polymer compositions containing reactive liquid carboxyl-containing polymers comprised of about 50% to about 100% by weight of interpolymerized units of a vinylidene monomer(s) listed supra in (a) through (e) with up to about 50% by weight of interpolymerized units of a monomer(s) listed supra in (f) through (i), are contemplated as being within the scope of this invention.

The reactive liquid polymers employed in the practice of the invention can be prepared by free-radical polymerization utilizing carboxyl-containing initiators and/or modifiers as disclosed in U.S. Pat. No. 3,285,949 and German Pat. No. 1,150,205, or by solution polymerization utilizing lithium metal or organometallic compounds and post-treating the polymers to form carboxyl groups, as disclosed in U.S. Pat. Nos. 3,125,716 and 3,431,235. The polymers can also be prepared by reacting reactive liquid polymers having other than terminal carboxyl groups with suitable compounds to yield carboxyl groups. For example, carboxyl terminated reactive liquid polymers can be prepared from hydroxyl terminated polymers by reaction with dicarboxyl compounds. Mercaptan, and amine, or amide terminated polymers can be reacted with unsaturated carboxylic acids or anhydrides to yield carboxyl-terminated polymers. Halogen-terminated polymers can be reacted with unsaturated anhydrides in the presence of Lewis acids to yield carboxyl groups. It may be seen that the method of preparing the liquid carboxyl-terminated polymer is not critical to the invention, providing the resulting polymer includes at least one terminal carboxyl group and a polymeric backbone consisting of carbon-carbon or carbon-oxygen linkages.

Examples of liquid carboxyl terminated polymers are carboxyl terminated polyethylene, polyisobutylene, polybutadiene, polyisoprene, poly(butadiene-acrylonitrile), poly(butadiene-styrene), poly(ethyl acrylate), poly(ethyl acrylate-n-butyl acrylate), poly(n-butyl acrylate-acrylonitrile), poly(butyl acrylate-styrene), and poly(butadieneacrylonitrile-acrylic acid).

Carboxyl-terminated poly(butadieneacrylonitrile) and carboxyl-terminated poly(butadiene-styrene) polymers have been found to be especially useful in the practice of the invention. Such polymers contain between about 5% to about 40% by weight of acrylonitrile or styrene, between about 0.5% to about 10% by weight of carboxyl, and between about 50% to about 95% by weight of butadiene, based on the weight of the polymer.

As is well known, butadiene in the carboxyl-terminated liquid polymers can be polymerized by either the 1,2 or the 1,4 mode of addition polymerization, depending on the type of catalyst and conditions employed. The two types of polybutadienes are believed to have the following structures:

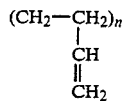　　

1,2-polybutadiene　　1,4-polybutadiene

Especially preferred are carboxyl terminated reactive liquid polymers that contain polybutadiene in the backbone and most preferably 1,4-polybutadiene. The pendant vinyl group on the 1,2-polybutadiene leads to self-crosslinking upon curing resulting in a thermosetting material. For this reason, carbpxyl terminated liquid polymer with a 1,2-polybutadiene backbone are particularly suited for applications such as coatings, films, casting material, and adhesives. The liquid polymers having a 1,4-polybutadiene backbone, on the other hand, do not have a pendant group and so, therefore, undergo chain extension upon curing to produce a thermoplastic material. A crosslinking or curing agent should be added to such a material to effect a cure since self curing is unlikely. Due to inherent properties, liquid polymers having a 1,4-polybutadiene backbone are suitable for improving the impact resistance of brittle materials. Use of 1-4 polybutadiene in the practice of the instant invention is preferred.

The phosphazene employed in the practice of the instant invention may be any suitable or conventional ring or chain polymer containing alternate phosphorus and nitrogen atoms and having generally two substituents on each phosphorus atom. Preferred are cyclic trimers and cyclic tetramers and linear polymers in which the number of phosphorus atoms does not exceed about 20. Desirably the phosphazene contains at least three phosphorus atoms.

Substituents on a phosphazene suitable for use in the practice of the instant invention may be selected from a group consisting of the halogens.

At least one such substituent should have carboxyl activating properties thereby facilitating a reaction between the phosphazene, the diamine and the reactive liquid polymer. Much preferred is the substituent chlorine, but other halogens such as fluorine and bromine find utility.

Not all substituents associated with the phosphazene need be carboxyl reactive or activating. The presence of carboxyl non-reactive or nonactivating substituents at selected sites upon the phosphazne can produce a reaction product between the phosphazene and the reactive liquid polymer in which cross-linking therebetween is appropriately restricted. Examples of such so-called blocking groups would include: straight chain, branched, unsaturated, cyclic, and arylic aminos, particularly $N(CH_3)_2$, $NH_2$, $NHCH_3$, $NHC_6H_5$, $HN-CH_2CH=CH_2$, $(CH_3CH_2)NH_2$, $(CH_3CH_2)_2NH$, $CH_3CH_2CH_2NH_2$, $(CH_3CH_2CH_2)_2NH$, $C_4H_9NH_2$, $(C_4H_9)_2NH$, piperidino, morpholino, and pyrrolidino; phenoxy or aryloxy such as $OC_6H_5$, $OC_6H_4CH_3$, meta $CF_3C_6H_4O$, meta $FC_6H_4O$, meta $CF_3OC_6H_4$ $NO_2C_6H_4$ and para $CH_3OC_6H_4O$; fluoralkoxy such as $OCH_2 C_zF_{2z+1}$ (1-z-3), $OCH_2(CF_2)_yH$ (y-10 and even), and $OCH(CF_3)_2$; ethyleneimine; pyrolle; alkoxy such as $OCH_3$, $OC_2H_5$, $OC(CH_3)_2H$, $OC_4H_9$, $OCH_2C_6H_5$; $OC_3H_7$, and $OCH_2CH=CH_2$; amino acid esters such as $NH_2CH_2COOC_2H_5$ and $NH_2CH_2CH_2COOC_2H_5$; isothiocyano such as NCS; alkylthio such as $C_2H_5S$, $C_3H_7S$, and $C_4H_9S$; arylthio such as $C_6H_5S$, and $C_6H_5CH_2S$; and aryl and alkyl having less than about 18 carbon atoms such as $CH_3$, $C_2H_5$, $C_4H_9$, $CF_3$, $C_3F_7$, $C_6H_5$, and $C_6H_4CH_3$.

A blocking group may also provide additional desirable properties to the reaction product of the phosphazene, the diamine and the reactive liquid polymer. For example, use of an amino as a blocking group can provide additional desirable hydroscopic properties, solubility in $H_2O$, and pharmacological compatability; use of phenoxies can provide thermal stability; use of a fluroalkoxy can provide ultra violet light stability, soil repellancy, thermal stability and chemical resistance; and use of aryl and alkyl can provide thermal stability. The phosphazene structure tends to provide flame and fire retardency properties at least in part due to the presence of nitrogen, phosphorus and halogen.

There is no requirement that a particular phosphazene compound be used exclusively in the reaction of the instant invention. Mixtures of phosphazene compounds may be employed to produce a desirable reaction product having a desirable cure time and demonstrating the effects of the presence of a desirable blocking substituent thereon. For example, mixtures of $P_3N_3Cl_6$ and $P_3N_3Cl_2(OPh)_4$ may be employed to provide a reaction product having thermal stability properties while curing relatively rapidly. By adjusting the ratio of the phosphazene compound employed, curing can be speeded or retarded, with an elevated proportion of $P_3N_3Cl_6$ providing generally a more rapid cure.

Phosphazenes are commercially well known and may be obtained from sources associated with The Firestone Tire & Rubber Company.

In the practice of the instant invention it is much preferred that the reactive liquid polymer be a carboxyl terminated butadiene-acrylonitrile copolymer. One factor impacting upon the preference for such a reactive liquid polymer is the relatively ready availability of such polymers commercially. Nonetheless, it is emphasized that other carboxyl terminated reactive liquid polymers having suitable or conventional backbone configurations as set forth herein can provide desirable polymeric reaction products with phosphazenes.

The scavenger may be any suitable or conventional scavenger for the chlorination product arising from the reaction between the phosphazene reactive liquid polymer and the diamine. Typically this elimination product is a hydrogen-halogen like hydrogen chloride. The scavenger should not become involved in the polymerization reaction between the phosphazene, the diamine and the reactive liquid polymer. Such scavengers as sodium carbonate and sodium bicarbonate as well as carbonates of other alkyl and alkyline earth metals can provide desirable hydrogen-halogen scavenging capabilities. Preferred in the practice of this invention are tertiary amines generally having alkyl branched or unbranched radicals but optionally including aryl and/or aryloxy radicals. Generally the number of carbon atoms in a particular radical does not exceed about 12 and preferably the number of carbon atoms in any particular radical of the tertiary amine does not exceed about 6. Much preferred in the practice of this invention is triethylamine.

Where a phosphazene having halogens to substituents other than chlorine is employed in the practice of this invention, the scavenger must be capable of scavenging hydrogen/halogen compounds evolved during a reaction between the diamine, the phosphazene, and the reactive liquid polymer. Typically, a compound suitable for scavenging hydrogen chloride would otherwise be suitable for scavenging hydrogen/halogen compounds produced by the reaction of phosphazenes having other than chlorine halogen substituents.

The diamine employed in the practice of the instant invention may be any suitable or conventional organic having two amino groups. The amino groups may be either primary or secondary amino groups, but primary amino groups are preferred as being more reactive.

The organic portion of a diamine employed in the practice of the instant invention typically comprises one or more so-called radicals having essentially only carbon-carbon bonds, the amino groups being affixed to the organic portion but preferably not more than one such amino group being formed to the same or adjacent carbon atoms within the organic portion. Precluding amino groups being joined in close proximity one to the next facilitates the reaction with phosphazene and the reactive liquid polymer. The number of carbon atoms contained within all radicals of the organic portion of a diamine finding utility in the practice of the instant invention generally is not less than 3 nor more than about 12. The organic portion or radical of a diamine suitable for use in the practice of the invention may be branched or unbranched alkyl, branched or unbranched dienes or trienes, cyclic compounds including those containing nitrogen within the ring, and allyl compounds.

It is important that the amino groups associated with the diamine be spaced sufficiently far one from the next to make reaction of both amino groups with the phosphazene unlikely. This consideration is particularly important where the diamine is possessed of a particularly short chained organic radical. Equally, it is important that diamines having longer chained organic radicals be selected carefully so as to reduce the opportunity for a so-called wrapping back of the organic portion of the diamine whereby both amino groups attached to the diamine react with the same phosphazene molecule. Therefore, it is desirable that the radicals comprising the organic portion of diamines selected for use in the practice of the instant invention and having relatively large number of carbon atoms therein be relatively stiff. Alkyl diamines having between about 4 and 8 carbon atoms find particular utility in the practice of the instant invention. Particularly desirable is hexane diamine. Also useful in the practice of the instant invention are aryl diamines such as para phenylene diamine; meta and ortho phenylene diamine find reduced utility in the practice of the instant invention, for example, since the amino groups positioned upon the ortho or meta phenylene diamines tend to permit reaction of both amino groups contained upon the phenylene diamine with the same phosphazene molecule.

EXAMPLE 1

2.5 grams of a carboxyl terminated reactive liquid polymer known as HYCAR 2000×162 CTB obtained from The B F Goodrich Company was dissolved in 15 milliliters (ml.) of toluene and two ml. of triethylamine. The resulting solution was clear and colorless. A phosphazene solution was prepared by dissolving 2.5 grams of $N_3P_3Cl_6$ in 8.0 ml. of toluene. The resulting clear colorless phosphazene solution was then added in one portion to the solution of the reactive liquid polymer while under agitation. The combined mixtures appeared slightly turbid but no increase in temperature was noted. After approximately two minutes of agitation, 12.0 milliliters of a 70% (aqueous) 1,6-hexanediamine solution was added in one portion to the combined mixtures. An extremely exothermic reaction followed with the reaction mixture becoming somewhat milky in color and then clearing to a colorless gell. During the exothermic reaction, the temperature of the combined mixtures rose from 23° C. to 75° C. over a period of between about 10 to 15 seconds. As the temperature of this reaction mixture increased, the viscosity of the mixture also increased until, after approximately one minute a rubbery material resulted. Upon removal of the rubbery material from the reaction flask no liquid solvent was found to remain within the reaction flask. The resulting rubbery material was washed with water until the washings were possessed of a neutral PH and the appearance of a crumb-like white substance which was further washed in order with ethanol, toluene, and ether and then vacuum dried to yield 3.32 grams of dry, white, crumb like polymer. Under the same conditions, if all the washing steps are omitted, the reacton product after air drying becomes a pale yellow rubbery or elastomeric material. Whether washed or unwashed, the reaction material demonstrates a bouncy and rubber-like behavior, is difficult to ignite and has a tendency to self extinguish. Upon burning, a considerable amount of residual char remains and a great amount of dense black smoke is generated while burning is underway.

EXAMPLE 2

The reaction of Example 1 was repeated, however, no phosphazene ($N_3P_3Cl_6$) was included. There was no exothermic reaction and no polymeric formation.

EXAMPLE 3

The reaction of Example 1 was repeated except using carboxyl terminated reactive liquid polymer known as HYCAR 1300×18 CTB. A similar white crumb like rubbery polymer resulted. The reactive liquid polymer in this example appeared to produce a faster reaction as indicated by a more rapid temperature rise than produced by the reactive liquid polymer in Example 1 produced.

EXAMPLE 4

Example 1 was repeated except employing a reactive liquid polymer known as HYCAR 1300×18 CTB. A similar white crumb like polymeric substance having rubbery characteristics resulted. The rate of reaction employing the reactive liquid polymer in this example appeared to be approximately equal to the rate of reaction as demonstrated by the reactive liquid polymer in Example 1 as evidenced by the relatively equal rates and extents of temperature rise upon introduction of the diamine.

EXAMPLE 5

Example 1 was repeated except that hexanediamine was omitted. No gel or rubbery polymer resulted.

EXAMPLE 6

Example 1 was repeated except omitting the reactive liquid polymer. A white polymer results. This white polymer is known chemistry for the reaction between a cyclophosphazene and a diamine wherein the diamine and the cyclophosphazene have chain extended and/or crosslinked the phosphazene rings. The resulting cyclomatrix/cyclolinear phosphazene did not demonstrate the rubbery characteristic of the reaction product of Example 1 and showed no hydroscopic tendencies.

The reaction products of Examples 1, 2-3, and 6 were dried, weighed and then emersed in a substantial excess of water. The reaction products of Examples 1 and 3-4 were found to absorb approximately 3 times their weight in water. The reaction product of Example 6 was found not to be hydroscopic.

Infared analysis of the reaction products from examples 1, 3 and 4 indicated the absence of a COOH functional group. Instead, the infared evidence indicated the presence of a secondary amide functionality, OCNH. Infared analysis also indicated the presence of a phosphazene group and the presence of unreacted phosphorus chlorine bonds.

More specifically, the reaction compounds from Examples 1, 3 and 4 demonstrated infrared absorption bands in the area of 3250 cm$^{-1}$ indicating the presence of a secondary amine; 1220 cm$^{-1}$ indicating the presence of phosphazene; and 515 cm$^{-1}$ indicating the presence of unreacted phosphorus chlorine bonds. An amide I band is observed at about 1640 cm$^{-1}$ and an amide II band is observed at about 1530 cm$^{-1}$ characteristic of secondary amides. It is believed that the reaction products of Example 1, 3 and 4 is possessed of a structure generally as follows:

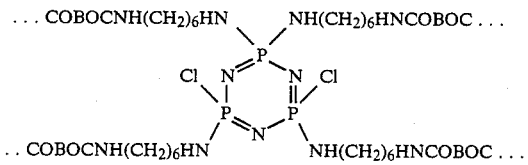

wherein the B or backbone linkages are further connected to other phosphazene trimers. There is no requirement that all carboxyl activators such as chlorine on a phosphorus trimer or other phosphazene employed in the practice of the invention be replaced, and particularly where employing phosphazene tetramers or linear polymeric phosphazene materials, it is unlikely in the absence of a significant proportion of blocking groups that all such chlorine substituents would be replaced.

It should be apparent that the reaction product of the instant invention can be prepared by combining the reactive liquid polymer, the scavenger, typically a tertiary amine, and the phosphazene, optionally including a solvent, and then adding the diamine under agitation. Such a procedure is facilitated by the reactive liquid polymer being generally in a liquid state and therefore readily amenable to admixture with the phosphazene and the tertiary amine. It should be noted that it is much preferred that the reactants be agitated following the addition of the diamine until reaching a gel state to promote uniform and reliable cross linking. Any solvents employed in facilitating the admixture of reactants can be removed by heating following completion of the reaction. Frequently, the energy evolved during the exothermic reaction of the instant invention will provide sufficient heat for solvent removal.

The reaction products of the instant invention find utility as additives to other polymeric systems where they may provide advantageous anti-drip and flame retardancy characteristics when such polymeric systems are exposed to open flame. In addition, the reaction products of the instant invention provide hydroscopic properties which can find utility in polymeric systems.

The reaction products of the instant invention demonstrate a substantial resistance to weight loss at temperatures in excess of 350° F. Thus, the reaction product of the instant invention provides a broad range of desirable elastomeric performance even at more elevated temperatures and can provide hydroscopic/hydrophilic properties in objects formed from the elastomeric reaction product of the instant invention.

Therefore, while a preferred embodiment of the invention has been shown and described in detail, it should be apparent that modifications and alterations can be made thereto without departing from the scope of the claims that follow.

What is claimed is:

1. A composition of matter comprising the reaction product of a carboxyl terminated reactive liquid polymer, a phosphazene, and a diamine, in the presence of a scavenger for elimination products, the reactive liquid polymer being of the form HOOCBCOOH wherein B is a backbone including at least one polymerized vinylidene monomer selected from a group consisting of (a) monoolefins having between 2 and 14 carbon atoms; (b) dienes having between 4 and 10 carbon atoms; (c) vinyl and allyl esters; (d) vinyl and allyl ethers; and (e) acrylates of the form CH$_2$=CH—COOR′, R′ being one of hydrogen, an alkyl radical of not more than 18 carbon atoms, an alkoxyalkyl, alkylthioalkyl, or cyanoalkyl radical having not more than 12 carbon atoms, the phosphazene having between 3 and 20 phosphorous atoms and including at least one carboxyl activating reactive substituent, the diamine being selected from among saturated or unsaturated, straight chained, cyclic, or acylic primary or secondary diamines having between about 3 and about 12 carbon atoms, the scavenger being selected from the group consisting of carbonates, bi carbonates and a tertiary amine having attached radicals selected from among saturated or unsaturated branched, straight chained, cyclic or acyl radicals having not more than about 6 carbon atoms.

2. The composition of claim 1, B including at least one of the monomers set forth therein polymerized with from 0 to about 50 weight percent of at least one co-monomer selected from the group consisting of (a) vinyl aromatics having the formula $CH_2=CH-C_6R_5$, wherein R is one of hydrogen, halogen, an alkyl radical containing from 1 to 4 carbon atoms; (b) vinyl nitriles having the formula $CH_2CR''CN$ wherein R'' is one of hydrogen and an acyl radical; (c) divinyls and diacrylates; (d) amides of $\alpha,\beta$-olefinically unsaturated carboxylic acids containing 2 to 8 carbon atoms; and (e) allyl alcohol.

3. The composition of claim 1, the carboxyl terminated reactive liquid polymer having a viscosity of between about 500 and $2.0 \times 10^6$ centipoises and being between about 0.5 and 10.0 weight percent carboxyl, the phosphazene being a cyclic tri or tetramer having at least one chlorine substituent.

4. The composition of claim 3, the carboxyl terminated reactive liquid polymer having a backbone comprising 1,4 polybutadiene and 0 to about 50 weight percent acrylonitrile.

5. The composition of claim 4, the diamine being an alkane diamine of between about 3 and 12 carbon atoms, and the scavenger being a tert-amine having not less than 3 and not more than 18 carbon atoms.

6. A method for making a polymeric hydrophile comprising the steps of:
(a) providing a carboxyl terminated reactive liquid polymer, phosphazene, a diamine, and a scavenger for elimination products, the reactive liquid polymer being the form HOOCBCOOH, wherein B is a backbone including at least one polymerized vinylidene monomer selected from a group consisting of (a) monoolefins having between 2 and 14 carbon atoms; (b) dienes having between 4 and 10 carbon atoms; (c) vinyl and allyl esters; (d) vinyl and allylethers; and (e) acrylates of the form $CH_2=CH-COOR'$, R' being hydrogen, alkyl radical of not more than 18 carbon atoms, an alkoxyalkyl, alkylthioalkyl, or cyanoalkyl radical having not more than 12 carbon atoms, the phosphazene having between 3 and 20 phosphorous atoms and including at least one amine reactive substituent, the diamine being selected from among saturated or unsaturated, straight chained, cyclic, or acylic primary or secondary amines having between about 3 and about 12 carbon atoms, the scavenger being selected from carbonates, bicarbonates and a tertiary amine having attached groups selected from among saturated or unsaturated, straight chained, cyclic or acyl radicals having not more than about 6 carbon atoms;
(b) combining the reactive liquid polymer, the scavenger and the phosphazene; and then
(c) adding the diamine to the combination under vigorous agitation and at a temperature at least sufficient to initiate an exothermic reaction.

7. The method of claim 6, B including at least one of the monomers set forth therein polymerized with from 0 to about 50 weight percent of at least one co-monomer selected from the group consisting of at least one of (a) vinyl aromatics having the formula $CH_2=CH-C_6R_5$, wherein R is one of hydrogen, halogen, an alkyl radical containing from 1 to 4 carbon atoms; (b) vinyl nitriles having the formula $CH_2CR''CN$ wherein R'' is one of hydrogen and an acyl radical; (c) divinyls and diacrylates; (d) amides of $\alpha,\beta$-olefinically unsaturated carboxylic acids containing 2 to 8 carbon atoms; and (e) allyl alcohol.

8. In the method of claim 7, the carboxyl terminated reactive liquid polymer having a viscosity of between about 500 and $2.0 \times 10^6$ centipoises and being between about 0.5 and 10.0 weight percent carboxyl, the phosphazene being a cyclic tri or tetramer having at least one chlorine substituent.

9. In the method of claim 8, the carboxyl terminated reactive liquid polymer having a backbone comprising 1,4 polybutadiene and 0 to about 50 weight percent acrylonitrile.

10. In the method of claim 9, the di-amine being an alkane diamine of between 3 and 12 carbon atoms, and the tert-amine having not less than 3 and not more than 18 carbon atoms.

* * * * *